US009632709B1

(12) United States Patent
Basham et al.

(10) Patent No.: US 9,632,709 B1
(45) Date of Patent: Apr. 25, 2017

(54) COLLOCATION OF OBJECT STORAGE DATA WITH REMOVABLE MEDIA

(71) Applicant: INTERNATIONAL BUSINESS MACHINES CORPORATION, Armonk, NY (US)

(72) Inventors: Robert B. Basham, Aloha, OR (US); Joseph W. Dain, Vail, AZ (US); Matthew J. Fairhurst, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/942,409

(22) Filed: Nov. 16, 2015

(51) Int. Cl.
G06F 12/00 (2006.01)
G06F 3/06 (2006.01)

(52) U.S. Cl.
CPC .......... G06F 3/0611 (2013.01); G06F 3/0644 (2013.01); G06F 3/0653 (2013.01); G06F 3/0683 (2013.01)

(58) Field of Classification Search
CPC ......... G06F 17/30082; G06F 17/30094; G06F 17/30144; G06F 17/30312; G06F 17/30377
See application file for complete search history.

(56) References Cited

U.S. PATENT DOCUMENTS

| 7,739,239 | B1 | 6/2010 | Cormie et al. |
| 8,751,449 | B2 | 6/2014 | Carmichael |
| 9,092,441 | B1 | 7/2015 | Patiejunas et al. |
| 2014/0281350 | A1 | 9/2014 | Lango et al. |
| 2014/0324920 | A1* | 10/2014 | Hamilton .......... G06F 17/30592 707/812 |

* cited by examiner

Primary Examiner — Yong Choe
(74) Attorney, Agent, or Firm — Griffiths & Seaton PLLC

(57) ABSTRACT

Various embodiments for managing data objects stored in a tiered data object storage environment, by a processor device, are provided. In one embodiment, a method comprises measuring a service level of a data set tagged to be collocated, and comparing accumulated service levels for a data distribution of the data set to a predetermined service level threshold value, such that if the predetermined service level threshold value is reached, a collocated data optimization event is performed.

18 Claims, 5 Drawing Sheets

COLLOCATION OF OBJECT STORAGE DATA WITH REMOVABLE MEDIA

BACKGROUND OF THE INVENTION

Field of the Invention

The present invention relates in general to computing systems, and more particularly, to various embodiments for managing data objects stored in a tiered data object storage environment.

Description of the Related Art

In today's society, computer systems are commonplace. Computer systems may be found in the workplace, at home, or at school. As computer systems become increasingly relied upon, convenient, and portable, the Internet has grown exponentially. Now more than ever, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for managing data objects stored in a tiered data object storage environment, by a processor device, are provided. In one embodiment, a method comprises measuring a service level of a data set tagged to be collocated, and comparing accumulated service levels for a data distribution of the data set to a predetermined service level threshold value, such that if the predetermined service level threshold value is reached, a collocated data optimization event is performed.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
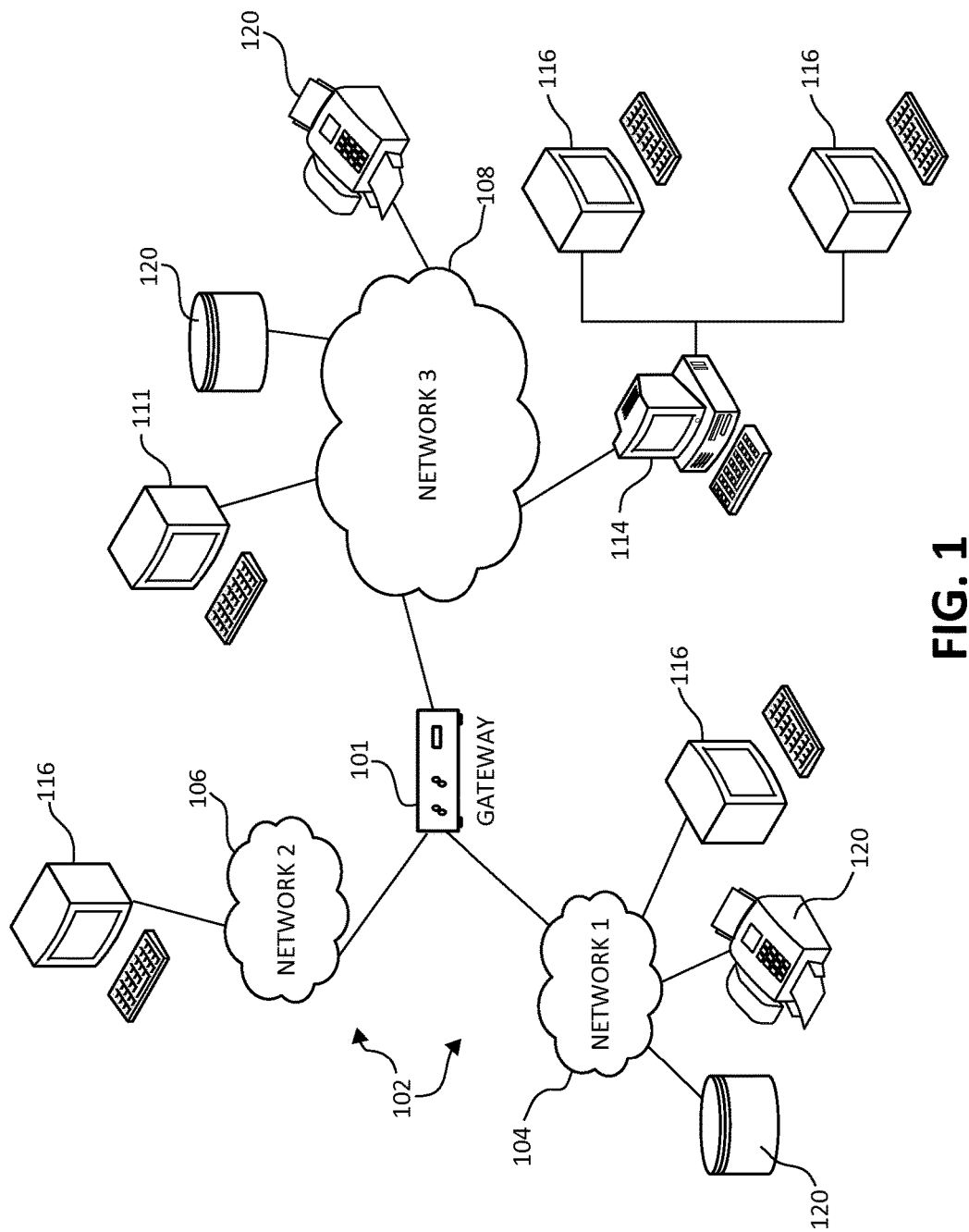
FIG. 1 illustrates a block diagram of a network architecture in which aspects of the present invention may be realized.

Described embodiments, and illustrative figures of various embodiments for managing data objects stored in a tiered data object storage environment are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Distributed storage (i.e. cloud storage) is primarily comprised of object storage at a massive scale. Object storage provides very little control over optimizing retrieval of large amounts of data. For example, OpenStack Swift only provides for bulk delete of containers, or of accessing data in a single container. This may be a problem because, at the massive scale, such data may be stored hierarchically across multiple storage tiers, such as flash storage, disk storage, and tape storage. For example, data that hasn't been read for a few hours may be moved from flash storage to disk storage, and data that hasn't been read for a few weeks may be moved to tape storage. Each of these storage tiers has different performance latencies, throughput characteristics, and cost points.

Object storage services do not provide a way to specify object movement. For example, object storage services do not provide a way to expedite the bulk movement of data from the lowest cost storage tier. Furthermore, when an application needs to immediately retrieve a large amount of data, the data may reside on the slowest storage tier, such as tape. Still yet, if the data is on tape as a part of a near-line object storage service, the object storage service may hide the mapping of objects to tape, making it impossible for the user of the object storage service to know how to optimally recall those objects. If the application requests a sparse data set across many tapes randomly, the recall time for the data set may be orders of magnitude slower than if the data set has been requested optimally.

Similarly, when reading large numbers of blocks of data out of object storage systems, the read may be performed in a non-optimal way. For example, multiple copies of the data may be put out on disk in a way that can exaggerate seek times and negatively impact performance. Additionally, requests may come in for each block, file, or object individually, and each request may be handled individually with no attempt to re-order requests to minimize read seeks.

Traditionally, sorting and collocation on tape is done by applications and middle-ware rather than by the tape system itself. Archive services are emerging with platforms that are based on object storage, however they provide no real practical hooks to allow an external application to control the placement of data on removable media. Beyond the definition of containers and specification of collocation in interface parameters, no guidance is supplied on how tape drive systems can provide for collocation of the data. An object storage service backed by tape, or other removable media, tends to store data in order corresponding to the time it is written. Some re-ordering may be possible if some buffering occurs, but ultimately there are limits on the amount of data that may be buffered and the amount of data that must be put down to media. For example, an incremental volume snapshot that is backed up once a week is likely to be disbursed across multiple tapes, or in separate locations on a single tape.

Yet it is known that in a disaster recovery situation in which a failure was to occur, a user (e.g. a storage administrator) would want the data restored (and quickly at that) in a very specific sequence. The user would have expectations on service levels and may be interested in paying a premium to establish a guaranteed service level agreement with their object storage service provider.

Tape archive applications and middle-ware have well-established methods of providing data collocation. They each rely on known tape technology that is being written to and exactly where data is positioned on media in order to provide for collocation of data. These approaches do not work with object storage, where all of this underlying technology is abstracted out.

Accordingly, the mechanisms of the present invention provide such features as measuring a service level of a data set tagged to be collocated. The accumulated service levels for a data distribution of the data set are compared to a predetermined service level threshold value that is agreed upon by a user and an object storage service provider, such that if the predetermined service level threshold value is reached, a collocated data optimization event is performed, as will be further described.

The mechanisms illustrated below may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
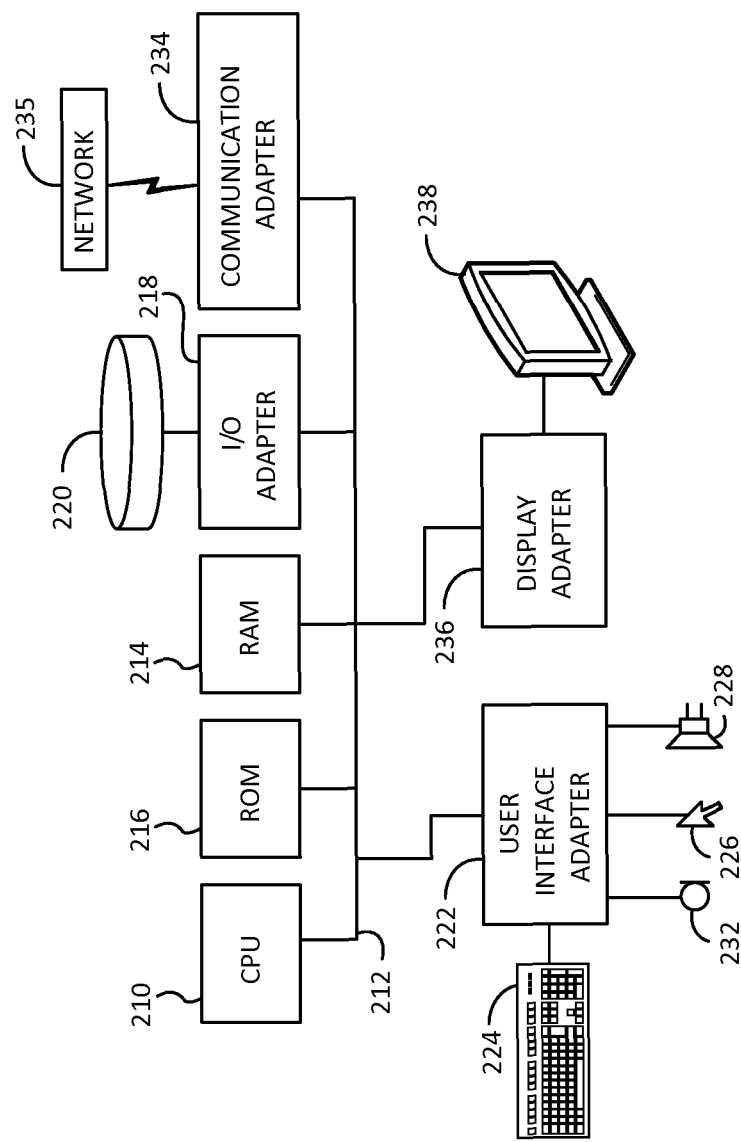
FIG. 2 illustrates a block diagram of a representative hardware environment that may be associated with the servers and/or clients of FIG. 1, in which aspects of the present invention may be realized.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
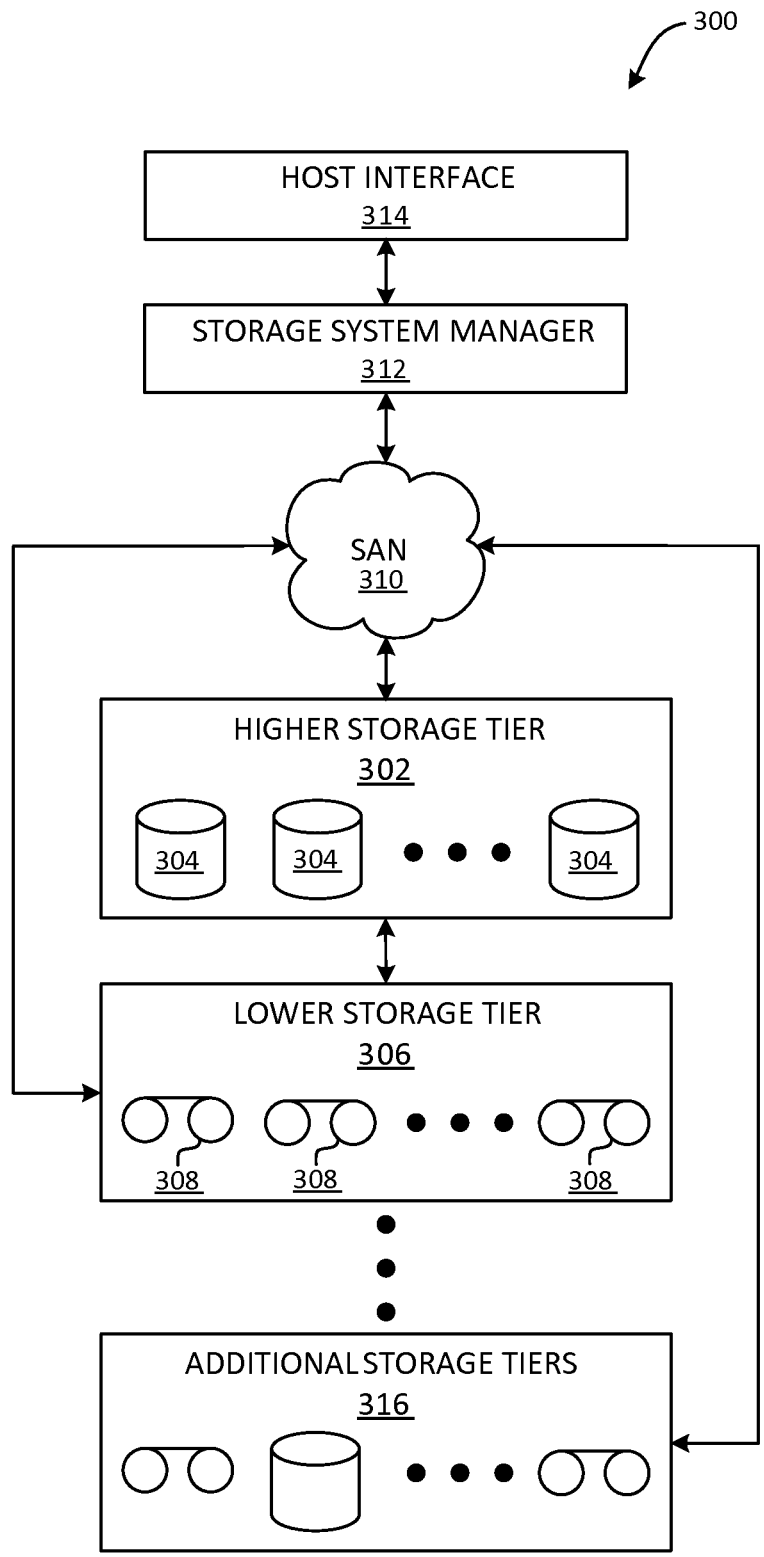
FIG. 3 illustrates a block diagram of a tiered data storage system, in accordance with aspects of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as disk or flash media (HDDs, SSDs), sequential access media (tape media in tape drives, optical media in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
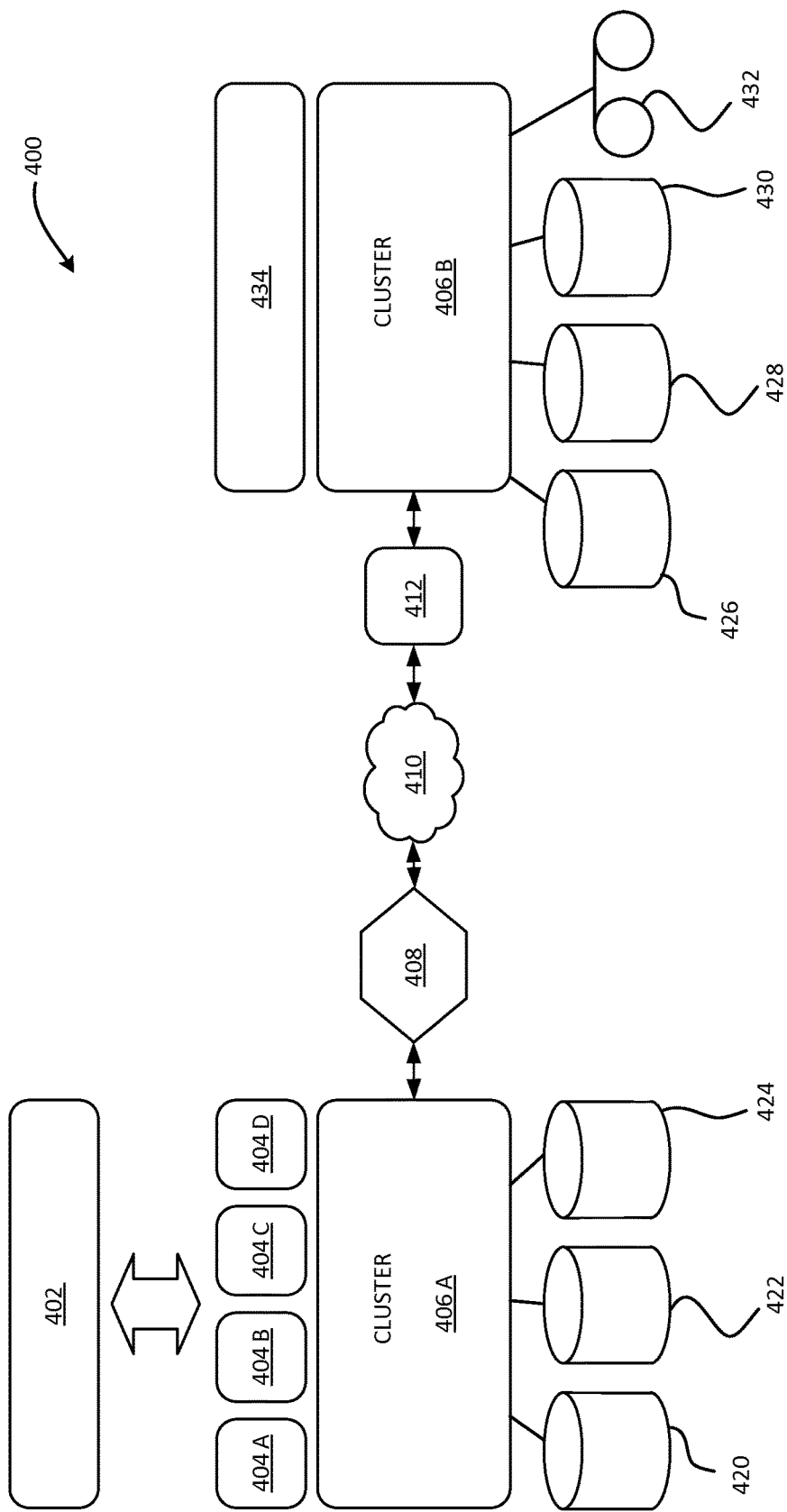
FIG. 4 illustrates a system for storing object data, in accordance with aspects of the present invention.

FIG. 4 depicts a system 400 for efficiently managing movement of object data, in accordance with one embodiment. As an option, the present system 400 may be implemented in conjunction with features from any other embodiment listed herein, such as those described with reference to the other Figs. Of course, however, such system 400 and others presented herein may be used in various applications and/or in permutations which may or may not be specifically described in the illustrative embodiments listed herein. Further, the system 400 presented herein may be used in any desired environment.

As shown in FIG. 4, the system 400 includes a storage application 402, a first cluster 406a and a second cluster 406b, a storage gateway 408, a cloud infrastructure 410, object storage platform 412, and an object storage service 434. In one embodiment, each of the clusters 406 may comprise a General Parallel File System (GPFS cluster).

The storage application 402 may communicate with the first cluster 406a using one or more standards and protocols 404. As shown in FIG. 4, the storage application 402 may communicate with the first cluster utilizing any of the four standards and protocols 404a, 404b, 404c, and 404d, however any number of standards and protocols may be implemented for communication between the first cluster 406a and the storage application 402.

In various embodiments, the storage application 402 may include any application that stores data to the clusters 406. Further, the object storage service 434 may include any service that provides network-based access to the file storage capabilities of the clusters 406.

In various embodiments, each of the standards and protocols 404 may be different from each other. For example, in one embodiment, the standards and protocols 404 may include a POSIX standard 404a, Network File System (NFS) protocol 404b, Common Internet File System (CIFS) protocol 404c, and WebSocket protocol 404d. Of course, in other embodiments, the standards and protocols 404 may be implemented as any known standards or protocols for accessing data.

Further, the storage gateway 408 includes any appliance or device that translates requests associated with a cloud storage application program interface (API) to another storage protocol. For example, the storage gateway 408 may translate requests of a cloud storage API to a block-based storage protocol (e.g., iSCSI, etc.) or a file-based storage protocol (NFS, SMB, etc.). Additionally, the storage gateway 408 is shown in communication with the cloud infrastructure 410, which is shown in communication with the object storage platform 412. The object storage platform 412 includes any interface through which an application may manipulate data stored as objects within a cluster. For example, in a particular embodiment, the object storage platform 412 may include OpenStack Swift, and the cloud infrastructure 410 may include SoftLayer Cloud. The clusters 406 may share data or communicate through the storage gateway 408, the cloud infrastructure 410, and the object storage platform 412.

The first cluster 406a is shown in communication with tiered storage 420-424. More specifically, the first cluster 406a is shown in communication with a first storage tier 420, a second storage tier 422, and a third storage tier 424. In various embodiments, each of the storage tiers may be associated with a different type of storage media. The types of storage media may be selected based on characteristics such as throughput, seek times, cost, archival reliability, etc. in a manner that most efficiently maximizes use of the tiered storage 420-424. For example, in one embodiment, the first storage tier 420 may include solid state drives, the second storage tier 422 may include fast hard disk drives, and the third storage tier 424 may include slow hard disk drives.

Similarly, the second cluster 406b is shown in communication with tiered storage 426-432. More specifically, the second cluster 406b is shown in communication with a first storage tier 426, a second storage tier 428, a third storage tier 430, and a fourth storage tier 432. In various embodiments, each of the storage tiers may be associated with a different type of storage media. The types of storage media may be selected based on characteristics such as throughput, seek times, cost, archival reliability, etc. in a manner that most efficiently maximizes use of the tiered storage 426-432. For example, in one embodiment, the first storage tier 426 may include solid state drives, the second storage tier 428 may include fast hard disk drives, the third storage tier 430 may include slow hard disk drives, and the fourth storage tier 432 may include tape media.

In use, data that hasn't been accessed for a first threshold period (e.g., minutes, hours, days, weeks, months, etc.) of time may be moved from a first storage tier to a second storage tier, such as, for example, from flash storage to disk storage. Further, data that hasn't been accessed for a second threshold period (e.g., hours, days, weeks, months, etc.) may be moved from the second storage tier to a third storage tier, such as, for example, from the disk storage to tape storage. While movement based on access is common, other movement criteria might be used. Thresholds for moving data between storage tiers may be configured within data management policies. As noted above, each of the storage tiers may have very different performance latency and throughput characteristics and cost points.

Figure 5:
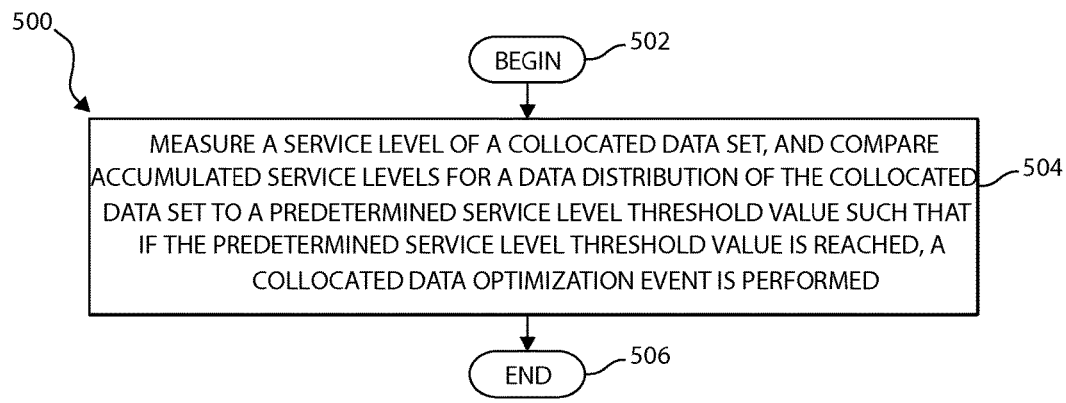
FIG. 5 illustrates a flow chart of a method for managing data objects stored in a tiered data object storage environment.

Continuing to FIG. 5, a method 500 for managing data objects stored in a tiered data object storage environment is illustrated, in accordance with one embodiment of the present invention. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 502, a service level of a data set tagged to be collocated is measured, and accumulated service levels for a data distribution of the data set are compared to a predetermined service level threshold value. If the predetermined service level threshold value is reached, a collocated data optimization event is performed (step 504). The method ends (step 506).

In various embodiments, when storing an object with an object storage service provider, each object may be associated with metadata, and a command directed to an object may be included in metadata of the object. For example, an object may be received from an application with the metadata that includes the command. In some embodiments, the command may be included in metadata of a container of an object, or a storage tier. In this manner, the object may be tagged via the command as it is being stored. In other embodiments, a command directed to an object may be received independent of the object and the metadata of the object. The command may be provided using a Representational State Transfer (REST) service, or may be provided as an Extensible Markup Language (XML) document.

In some embodiments, the command may include collocation guidance or anti-collocation guidance for the object from the application. In one embodiment, the command including collocation guidance or anti-collocation guidance may be provided by the application when the application writes the object. The collocation or anti-collocation guidance may be used by an object storage service to optimally store data of the object for future read access.

More specifically, collocation guidance may be provided that directs the sequenced storage of multiple objects for future reads. For example, if an application, during a backup operation, provides a plurality of objects to an object storage service, without a command providing collocation guidance, the object storage service may not be aware that the objects are related. As a result, the objects may be moved to a plurality of different tapes during execution of one or more information lifecycle management policies that are responsible for moving data to a lower storage tier when the data has not been accessed for a period of time. If the objects are ever recalled (i.e., during a restore, etc.), then each of the tapes will need to be mounted and read. The mounting and reading of multiple tapes may be characterized by long seek times, as well as have adverse effects to the tapes.

In contrast, if the application, during the backup operation, provides the plurality of objects to the object storage service with a command providing collocation guidance, then, during execution of the one or more information lifecycle management policies, all of the objects may be moved to a single tape or a small subset of tapes. In a large object storage system, only some nodes may have access to the single tape or the subset of tapes. Therefore, the collocation may involve object storage identifying the disk storage nodes that can write to the single tape or the small subset of tapes, directing PUT requests for the to-be-collocated objects to the identified nodes, and using the identified nodes to initially store the to-be-collocated objects to disk and to move them to and from the single tape or the small subset of tapes. If the objects are ever recalled (i.e., during a restore, etc.), then only the one tape or the small subset of tapes may need to be mounted and read. As a result, backup and restore operations of the objects, especially where the data of the objects is retrieved largely in a sequential manner, may be made more efficient.

The metadata may consist of: an identifier for the data set to be collocated, a location of which removable media element each object is located on, and an accumulator per removable media element of the data that is present from each data set being stored on the removable media (both number of objects and number of bytes) and the total seek time to reach the various elements on that media. A tag for level of approximation associated with each removable media element may also be included. If collocation has been specified to be sequenced, the sequence number per object may also be stored.

In one embodiment, as data tagged as collocated is stored onto tape, a running entropy total for the data that is tagged as collocated is preserved and the overhead associated with media access is kept (mount and seek times). This is provided as to measure an entropy per removable media element, with a goal of keeping the entropy below a certain predetermined service level threshold value per removable media element.

Accumulated service levels being achieved with the data distribution of the collocated tagged data are compared against service levels desired. If the predetermined service level threshold value is reached, a data collocation optimization event is performed. In one embodiment, the data collocation optimization event comprises a read and rewrite of the data in a more optimal distribution among one or more removable media elements.

Once the predetermined service level threshold value has been reached and the data collocation optimization event is triggered, the distributed data is read and re-written such that it is actually collocated on the same media, or alternatively, set of media, if performance provided by data striping is needed.

In various embodiments described herein, entropy comprises a measurement of time necessary to move about the removable media element to access the data (either sequentially or in no order, depending on the collocation type specified), divided by the total number of bytes of the data set on the element. In general, entropy thresholds may be reached due either to data being distributed widely on the removable media element (in the case of tape in particular) or by there being too few data elements on that particular media.

In one embodiment, as one or more new data objects are written to a removable media element for a particular collocated data set, the metadata mentioned above is updated to reflect the additional data objects thereon. Before the write is commenced and after the write is completed, the object storage software requests from the tape drive a Receive Recommended Access Order command for the objects in the data set. Only a compute on the delta seen previously is needed to calculate an overall entropy time using estimated time values returned. Measurements may only be needed when the number of objects on a tape is sparse. (Note that for optical media where locate times are negligible, it is sufficient simply to measure the accumulated amount of data per removable media element).

The entropy of data objects deleted from a removable media element is more difficult to calculate. The challenge is that a delete of data from a set of collocated data does not typically drive a mount of the removable media element. Hence, there is no way to measure the exact impact on entropy that is practical. One solution is to perform an approximation technique until the next write. Provided that an adequate amount of deletes have been completed, an object storage manager may mount tapes at non-peak load times to get an accurate measurement using the same approach as is done for writes discussed above. For example, removable media that has been tagged as having approximations may be flagged. A degree of an approximation field is incremented each time a delete occurs without a mount. The degree of approximation field is zeroed when that removable media is mounted, and an exact measurement is taken.

Once the predetermined service level threshold value is reached for the entropy measurement, the collocated data optimization event is performed. That is, the data set is read and re-written such that it is redistributed on the removable media element(s) in a collocated manner. Data sorting within tape media is well-known in the art. Many techniques may be used to develop data needing to be collocated (sequentially or not), and pull such data together across one or many tapes. A first priority is to reduce the entropy on the media down to a point where it can meet service levels guaranteed by an object storage service being backed by removable media. However, it is understood that since a tape media is being refactored it might be possible to reduce entropy for all data tagged as collocated on that removable media. It is also contemplated that reconciliation operations may be combined with refactoring to meet such service level agreements.

Figure 6:
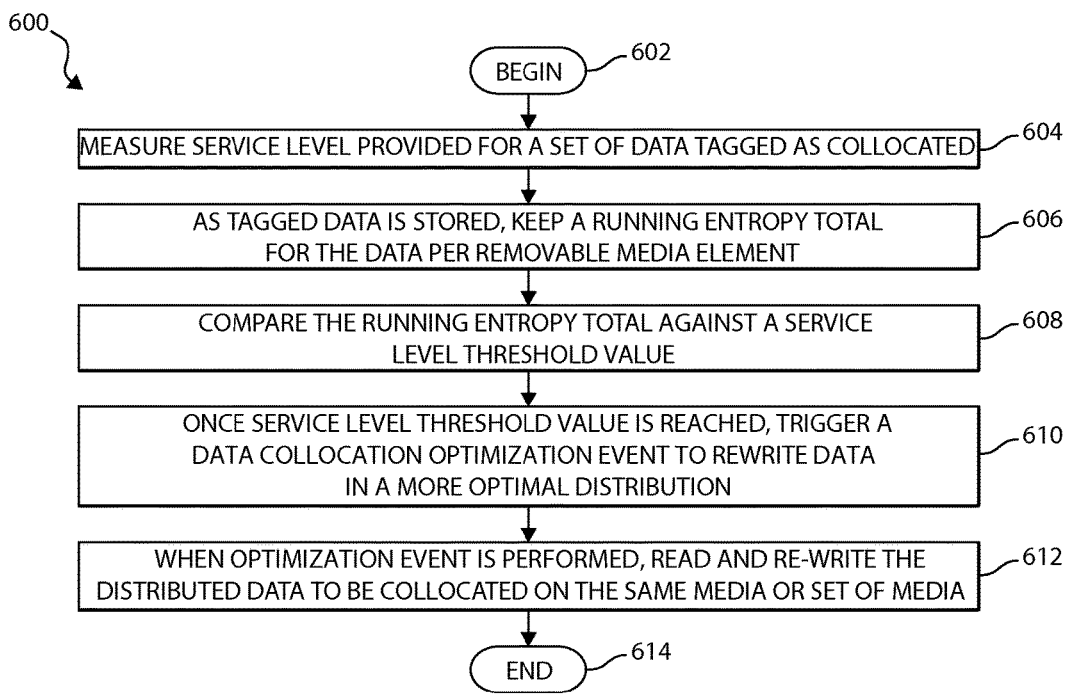
FIG. 6 illustrates an additional flow chart of a method for managing data objects stored in a tiered data object storage environment.

FIG. 6 illustrates a method 600 for managing data objects stored in a tiered data object storage environment, in review of embodiments of the present invention. As aforementioned the method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 602, a service level provided for a set of data tagged as collocated is measured (step 604). The data may be tagged as collocated using metadata or any other method as discussed above. As data tagged as collocated is stored, a running entropy total for the data per removable media element is kept (step 606). The running entropy total is compared against a predetermined service level threshold value (step 608). Once the predetermined service level threshold value is reached, a collocated data optimization event is triggered to be performed (step 610). The collocated data optimization event comprises reading and re-writing the data set in a collocated fashion across one or more removable media elements (step 612). The method ends (614).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data objects stored in a tiered data storage environment, by a processor device, comprising:

measuring a service level of a data set tagged to be collocated by determining an entropy level per a removable media element for the data set, and comparing accumulated service levels for a data distribution of the data set to a predetermined service level threshold value; wherein if the predetermined service level threshold value is reached, a collocated data optimization event is performed.

2. The method of claim 1, wherein the entropy level is determined by a per removable media element calculation of an amount of time to seek the data set divided by a total number of bytes of the data set.

3. The method of claim 1, wherein the predetermined service level threshold value is determined by an agreement between a user and an object storage service provider.

4. The method of claim 1, wherein the data set is tagged to be collocated by metadata information included within the data set.

5. The method of claim 1, wherein the collocated data optimization event further includes reading and re-writing the data set such that the data set is collocated on at least one of a same removable media element and a plurality of removable media elements.

6. The method of claim 1, wherein the removable media element includes at least one of a tape media, an optical media, a disk media, and a flash media.

7. A system for managing data objects stored in a tiered data storage environment, the system comprising:
 a multi-tiered data storage system; and
 at least one processor device, wherein the at least one processor device:
  measures a service level of a data set tagged to be collocated by determining an entropy level per a removable media element for the data set, and compares accumulated service levels for a data distribution of the data set to a predetermined service level threshold value; wherein if the predetermined service level threshold value is reached, a collocated data optimization event is performed.

8. The system of claim 7, wherein the entropy level is determined by a per removable media element calculation of an amount of time to seek the data set divided by a total number of bytes of the data set.

9. The system of claim 7, wherein the predetermined service level threshold value is determined by an agreement between a user and an object storage service provider.

10. The system of claim 7, wherein the data set is tagged to be collocated by metadata information included within the data set.

11. The system of claim 7, wherein the at least one processor device performs the collocated data optimization event by reading and re-writing the data set such that the data set is collocated on at least one of a same removable media element and a plurality of removable media elements.

12. The system of claim 7, wherein the removable media element includes at least one of a tape media, an optical media, a disk media, and a flash media.

13. A computer program product for managing data objects stored in a tiered data storage environment, by a processor device, the computer program product embodied on a non-transitory computer-readable storage medium having computer-readable program code portions stored therein, the computer-readable program code portions comprising:
 an executable portion that measures a service level of a data set tagged to be collocated by determining an entropy level per a removable media element for the data set, and compares accumulated service levels for a data distribution of the data set to a predetermined service level threshold value; wherein if the predetermined service level threshold value is reached, a collocated data optimization event is performed.

14. The computer program product of claim 13, wherein the entropy level is determined by a per removable media element calculation of an amount of time to seek the data set divided by a total number of bytes of the data set.

15. The computer program product of claim 13, wherein the predetermined service level threshold value is determined by an agreement between a user and an object storage service provider.

16. The computer program product of claim 13, wherein the data set is tagged to be collocated by metadata information included within the data set.

17. The computer program product of claim 13, wherein the collocated data optimization event further includes an executable portion that reads and re-writes the data set such that the data set is collocated on at least one of a same removable media element and a plurality of removable media elements.

18. The computer program product of claim 13, wherein the removable media element includes at least one of a tape media, an optical media, a disk media, and a flash media.

* * * * *